United States Patent
Wach et al.

(10) Patent No.: US 6,298,598 B1
(45) Date of Patent: Oct. 9, 2001

(54) MATERIALS FOR MYCOCULTURE

(75) Inventors: Mark Peter Wach, Allison Park; Richard W. Kerrigan, Worthington; Lori Ann MacDonald, Valencia; Barbara Jean McAuley, Adrian, all of PA (US)

(73) Assignee: Sylvan America, Inc., Dayton, NV (US)

(*) Notice: Subject to any disclaimer, the term of this patent is extended or adjusted under 35 U.S.C. 154(b) by 0 days.

(21) Appl. No.: 09/375,644

(22) Filed: Aug. 17, 1999

(51) Int. Cl.⁷ ...................................................... A01G 1/04
(52) U.S. Cl. .................................................................. 47/1.1
(58) Field of Search ........................... 47/1.1, 9; 119/171, 119/172, 173

(56) References Cited

U.S. PATENT DOCUMENTS

| | | | |
|---|---|---|---|
| 4,337,594 | * 7/1982 | Hanecek et al. | 47/1.1 |
| 4,443,969 | * 4/1984 | Hanacek et al. | 47/1.1 |
| 5,173,434 | * 12/1992 | Morris et al. | 436/172 |
| 5,429,073 | * 7/1995 | Balllard | 119/171 |
| 5,458,877 | * 10/1995 | Obayashi et al. | 47/1.1 X |
| 5,503,647 | * 4/1996 | Dahlberg et al. | 47/1.1 |
| 5,643,728 | 7/1997 | Slater et al. | 435/6 |
| 5,665,538 | 9/1997 | Slater et al. | 435/6 |
| 5,763,176 | 6/1998 | Slater et al. | 435/6 |
| 6,029,394 | * 2/2000 | Kananen et al. | 47/1.1 |
| 6,101,978 | * 8/2000 | Steckel | 119/173 |

FOREIGN PATENT DOCUMENTS

| | | | |
|---|---|---|---|
| 002676158A | * 11/1992 | (FR) | 47/1.1 |
| 403297325A | * 12/1991 | (JP) | 47/1.1 |
| 404004814A | * 1/1992 | (JP) | 47/1.1 |
| WO 93/13647 | * 7/1993 | (WO) | 47/1.1 |

OTHER PUBLICATIONS

Hawley's Condensed Chemical Dictionary, 13th ed., John Wiley & Sons, Inc., 1997, p. 417.*

* cited by examiner

*Primary Examiner*—Peter M. Poon
*Assistant Examiner*—Jeffrey L. Gellner
(74) *Attorney, Agent, or Firm*—Woodcock Washburn Kurtz Mackiewicz & Norris LLP

(57) ABSTRACT

The present invention provides improved mushroom cultivation materials which are amenable to improved uniformity of application to mushroom beds. The invention features such materials having particulate indicator therein having a color which is discernable from the organic substrates of the cultivation materials. The application may be followed under incandescent, fluorescent or ultraviolet light or in accordance with other means.

17 Claims, 1 Drawing Sheet

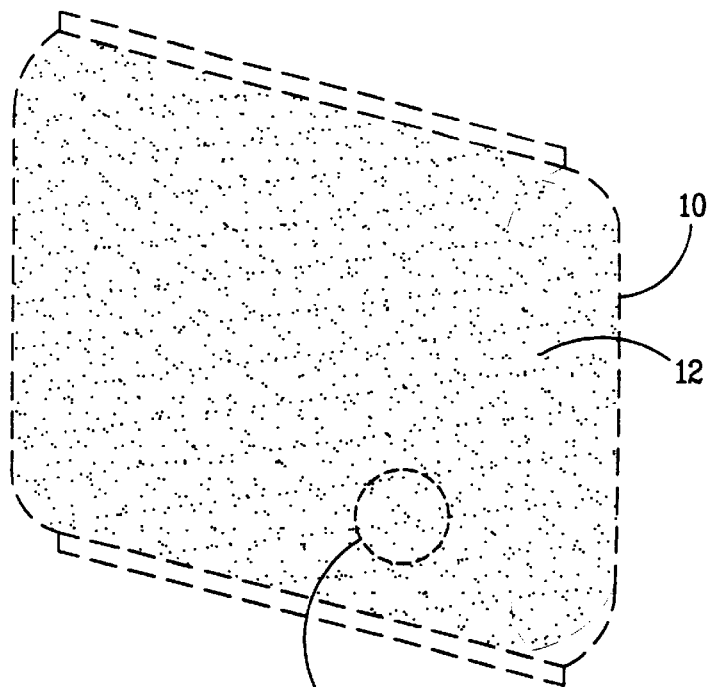
FIG. 1
FIG. 1A
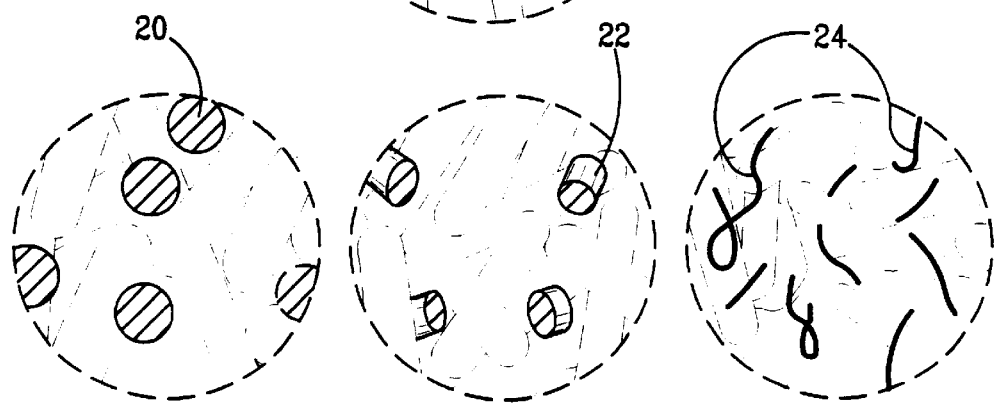
FIG. 2A     FIG. 2B     FIG. 2C

MATERIALS FOR MYCOCULTURE

FIELD OF THE INVENTION

The present invention relates to improved culture of mushrooms. In particular, the present invention provides materials for use in mushroom culture which can be applied with improved uniformity of coverage.

BACKGROUND OF THE INVENTION

In commercial mushroom culture, a bed of growth medium is prepared from any or a combination of organic materials such as horse manure, bagasse, crop residue, animal bedding, chicken feathers and any of a host of other substances such as hay, gypsum, sawdust, straw, soybean products, urea and the like. The growth medium is then inoculated with mushroom spawn. Mushroom spawn is comprised of an organic carrier, such as partially cooked grain, optional and well-known adjuvants, such as pH controlling agents, and mushroom mycelium. The mycelium is conventionally grown in situ and derives from an inoculum produced from the species or variety of mushroom to be grown. The inoculated grain or other substrate is then allowed to incubate under conditions of time, temperature and humidity applicable to the particular species being grown. The inoculum invades the substrate with networks of mycelium to form the spawn.

The spawn, that is the substrate with attendant mycelium, is then applied to the growth medium. The mushroom mycelium invades the growth medium, deriving nutrition therefrom. The resulting myceliar network provides the basis for subsequent fruiting of mushrooms from the mushroom bed. In accordance with certain preferred aspects of mycoculture, a casing material is applied to the bed some time after application of the spawn to it. Casing material, which is known per se, is a further organic material. It is believed to spur the rapid and profound development of mushroom fruit from the bed.

After an initial development or "break" of mushrooms from a bed and their harvest, a further period of time will typically find the emergence of one or more further breaks for harvest. In some practices, additional nutrients are applied to the bed to provoke or nourish such further development. All of the foregoing are well known to persons of ordinary skill in the art and science of mycoculture. Such persons will further appreciate that a very wide range of organic materials may be used in such culture, however the large majority of materials commonly used are monotonic in color. That is, all of the materials typically used, the growth medium, the spawn, casing material and nutrient layers are generally a shade of light brown or tan to dark brown in color. It can be difficult to achieve uniform application of spawn to growth medium in a bed, to apply casing material in a uniform layer and to nourish beds uniformly following an initial break of mushrooms such that maximum re-fruiting occurs.

It is clearly desired to achieve improved uniformity of application of all such materials, denominated "mushroom culture materials" so as to minimize the amount used, thus minimizing materials, storage, transportation and labor costs. The present invention is directed to this long-felt need.

SUMMARY OF THE INVENTION

The present invention achieves the foregoing goals by providing mushroom culture material comprising organic substrate or substrates. Dispersed within the organic substrate is an indicator in particulate form. The particulate indicator has a color which may be perceived in any convenient way, such as by viewing under ambient light, e.g. incandescent or fluorescent light or sunlight, or under ultraviolet light. In accordance with other embodiments of the invention, perception of the indicator may occur through means other than visualization. Thus, magnetic, electromagnetic or other means of discernment of the particles may be employed. The color of the particulate indicator particles or other means of discernment is selected to permit the particles to be discerned from the organic substrate materials.

BRIEF DESCRIPTION OF THE DRAWINGS

FIG. 1 depicts a quantity of mushroom culture material having particulate indicator dispersed therein. FIG. 1a shows an enlarged view of the mushroom culture material having a particulate indicator of FIG. 1.

FIGS. 2a, 2b and 2c show exemplary alternative shapes of indicator particles.

The mushroom culture material may be any of the materials commonly applied to mushroom beds which employ an organic substrate and which are advantageously applied uniformly, especially in a uniform layer. Thus, mushroom spawn, casing material and nutrient are among the mushroom culture materials which may benefit from the practice of this invention.

The organic substrates which commonly comprise mushroom culture materials generally possess a brown coloration. Thus, it is preferred to select a color of particulate indicator different from brown or tan. Orange, blue, green, yellow, red, violet and other colors are particularly useful. Colors which manifest themselves under irradiation by ultraviolet light are also preferred for some applications, since small particles, those which are smaller than the typical size of organic material forming the substrate, are preferred for use in this invention and indicate their presence very well when pigmented to fluorescence under ultraviolet light.

It is preferred that the particulate indicators be largely or completely insoluble in water or in the mushroom culture materials to which they are to be applied. Likewise, the pigmentation of the particles should be reasonably stable. Plastic materials are convenient for use as the particulate indicators since they are widely available, non-toxic, available in many sizes of particulate form, and available in a wide range of pigmentation. They may be pigmented to be visible under ambient sunlight, incandescent, fluorescent or ultraviolet light. Materials other than plastics may be used. Thus, minerals may be employed, especially those which are reasonably insoluble in water and which can hold a pigment. For example, perlite, which is of volcanic origin, vermiculite, calcium carbonate or limestone can be particulated if necessary and pigmented to an adequate degree so as to function as particulate indicators in connection with some embodiments of this invention.

The indicator particles can be present in a number of forms. Thus, they may be granulated or formed or made available as elongate bodies, spheres, chunks, cubes, fibrils, fibers, or, indeed, any convenient shape. Such particles may possess one or more forms of discernment such as a pigment or a plurality of pigments which are discernable under the same or different forms of illumination. Such discernment may also be designed to be effectuated via automation, via machinery or through robotic apparatus. Thus, for example, such particles may have one or a plurality of colors, may have one color visible under visible light and another which fluoresces. Moreover, the invention may employ mixtures of particles having different modes of discernment such as visualization and detection by magnetic or electromagnetic means.

The means of discernment may be other than color. Thus, the particles may comprise micro transponders which, when irradiated with electromagnetic energy, retransmit a portion of that energy in a detectable form. Such transponders are known per se, such as for use with the identification of merchandise, pets, farm animals and the like. Similarly, means of detection of the retransmitted energy from such transponders are known. Discernment may also be of magnetic particles. A wide variety of magnetic materials are known and can be easily formulated. Detection of such magnetic particles through magnetometric means is, similarly, well known. In this specification, it will be understood that small magnetic, transponder and other discernable materials may be substituted for the colored particles described.

FIG. 1 depicts a quantity of mushroom culture material 10 having particles 12 of indicator dispersed therein. The particles are of a size as to be visible within the culture material, although they may be small. FIG. 1a provides an enlarged view. The particles are, in this embodiment, plastic granules and are shown along with partially cooked grains of rye or wheat 14 (in phantom), commonly used for mushroom spawn.

FIGS. 2a, 2b and 2c show some of the many alternative shapes of indicator particles. In FIG. 2a, spheroidal particles 20 are depicted, while in FIGS. 2b, cylindrical particles 22 are shown such as would be achieved by chopping a rod of material having circular cross section. Filamentitious particles 24 are shown in FIG. 2c.

In practice, mushroom culture material is applied to a mushroom growing bed. The mushroom culture material has particulate indicator therein such that the progress of application can be followed. This permits the discernment of the presence and uniformity of amount of the mushroom culture material. The discernment is preferably visual, although machine mediated discernment may be employed. The visualization of the particles, especially their density, permits a determination of the uniformity of amount of mushroom culture material. Thus, the discernable color difference between the particulate indicator and the prevailing brown color of both mushroom growing bed materials and the mushroom culture material being applied facilitates such visualization. The applier of the mushroom culture material is, thus, now able to adjust the application to ensure the desired coverage amount and distribution and more closely to approach uniformity of application. Such adjustment is in response to the monitoring of the distribution of the particulate indicator in the material. This holds true for all of the different mushroom culture materials known for use which derive their substrate from a material colored essentially similarly to the mushroom bed to which they are to be applied.

EXAMPLES

Example 1

Preparation of Indicating Mushroom Spawn 8000 g of cleaned rye grain is mixed with 650 g of chalk, 50 g of gypsum and 4670 g of water. The ingredients are mixed and sterilized at 121° C. for 20 minutes and allowed to cool until the mixture is below 35° C. The spawn mixture is inoculated with 100–200 g of fungal inoculum and 300 g of finely ground (>1 mm) blue polypropylene which has been chemically sterlized. The materials are mixed for 10 minutes to ensure complete homogeneity. Sterile polyethylene bags, containing a microporus filtration strip, are filled with the product and incubated at 25° C. until the spawn is fully colonized. At this point the spawn may be used to inoculate the mushroom growing substrate or alternatively it may be stored for up to 6 months at 4° C. before use. The small particles of blue indicator may be clearly discerned from the brown color of the spawn.

Example 2

Preparation of Indicating Mushroom Casing Inoculant Material

To 1000 g of Custom Commercial potting mix (Ball Seed Co.), is added 3 g of finely ground (<1 mm) green, ultraviolet fluorescent polycarbonate. The materials are sterilized and cooled as in Example 1 above. Prepared fungal inoculum, 1.5% by weight, is added to the sterilized cooled mixture and mixing occurs as described in Example 1 above. The product is filled into sterilized polyethylene bags and incubated at 25° C. until fully colonized. At this point the material is suitable for use as a casing soil inoculant or may be stored at 4° C. for up to 6 months before use. Upon application of ultraviolet light, the particles of ultraviolet active polymer glow and can easily be seen in partially darkened conditions.

Example 3

Preparation of a Mushroom Supplement Nutrient

Soybean meal having a protein content of 42–46% is treated with formaldehyde at a concentration of 6000 PPM and heated to 100° C. Fluorescent perlite is prepared by spraying a 1% fluorescein solution onto the perlite particles using a spray bar placed inside a ribbon blender. The perlite indicator is mixed with the soybean meal material at a rate of 1% by weight. The final product is packaged in sealed 50 lb bags. The greenish perlite particles may be seen under ambient light, but are readily distinguishable under ultraviolet light.

Example 4

Application of Mushroom Spawn to a Prepared Mushroom Bed

Prepared mushroom spawn is added to pasteurized mushroom compost or growing substrate as follows. Spawn prepared as described in Example 1 above is spread over the surface of the prepared substrate at a rate of 1 kg per 100 kilos of prepared substrate. The spawn is mixed into the compost by means of a machine which moves along the beds of prepared substrate.

The uniformity of application was monitored visually under ambient light. The blue coloration of the particulate polymer was easily discerned and made the brown-on-brown colorscape of the bed differentiable into prepared bed and spawn components. The spawn was applied to achieve substantially uniform application to the bed.

Example 5

Application of Mushroom Casing to a Developed Mushroom Bed

Casing inoculum prepared as described in Example 2 above and containing particles which are fluorescent in the presence of ultraviolet radiation is distributed over the surface of freshly cased mushroom beds at a rate of 100 units (75 liters) per 100 square feet. The material is mixed into the casing layer by hand. By shining an ultraviolet light source over the surface of the casing layer, the uniformity of the casing inoculant application and subsequent incorporation is easily determined.

While the present invention has been described in some detail, other aspects of the invention will be apparent to persons of ordinary skill in the art of mycoculture.

What is claimed is:

1. A mushroom culture material comprising organic substrate and, dispersed within the substrate, particulate indicator in the form of pigmented plastic having a color discernable from said substrate.

2. The material of claim 1 wherein said particulate indicator is discernable under incandescent light.

3. The material of claim 1 wherein said particulate indicator is discernable under fluorescent light.

4. The material of claim 1 wherein said particulate indicator is discernable upon irradiation with ultraviolet light.

5. The material of claim 1 comprising mushroom spawn.

6. The material of claim 1 comprising mushroom casing material.

7. The material of claim 1 comprising mushroom nutrient.

8. The material of claim 1 wherein said color is a color other than brown.

9. The material of claim 1 wherein said particulate indicator is substantially insoluble in water.

10. A mushroom culture material comprising organic substrate and, dispersed within the substrate, particulate indicator in the form of magnetic particles or electromagnetic micro transponders discernable from said substrate.

11. The mushroom culture material of claim 10 wherein said particulate indicator comprises a mixture of particles having different properties for discernment.

12. A method for applying mushroom culture material to a growing bed comprising monitoring the application of said material to said bed through discerning the presence and uniformity of amount of a particulate indicator in the form of pigmented plastic, magnetic particles or microtransponders in said culture material.

13. The method of claim 12 wherein said monitoring is under ultraviolet light.

14. The method of claim 12 wherein said discerning comprises visualization.

15. The method of claim 12 wherein said discerning is either automated or achieved electromechanically or robotically.

16. The method of claim 12 wherein said discerning is either automated or achieved electromechanically or robotically.

17. The method of claim 12 further comprising adjusting the amount or distribution of said mushroom culture material in response to said monitoring.

* * * * *